Sept. 24, 1968　　　　G. L. WITT　　　　3,402,675

SUSPENDED CARRIER DESPATCH STATION AND TRIPPER

Filed May 23, 1966

INVENTOR
GEORGE L. WITT

BY *Cullen, Sloman, & Cantor*

ATTORNEYS

United States Patent Office 3,402,675
Patented Sept. 24, 1968

3,402,675
SUSPENDED CARRIER DESPATCH STATION
AND TRIPPER
George L. Witt, Pontiac, Mich., assignor to My-T-Veyor
Corporation, Oxford, Mich.
Filed May 23, 1966, Ser. No. 552,264
8 Claims. (Cl. 104—88)

ABSTRACT OF THE DISCLOSURE

In a trolley conveyor system including a trackway movably mounting a trolley conveyor, an unloading station including a frame having a track to guidably receive the conveyor, a selectively located stop on said frame, said conveyor mounting a hook to hold a hanger, and a hanger retaining member pivotally mounted upon the conveyor engageable with the hanger and adapted to shift it laterally along the hook to discharge the hanger when the tripper member engages the stop.

---

The present invention is directed to the dumping or unloading station for use in conjunction with a trolley conveyor system, which includes an elongated trackway and a plurality of longitudinally spaced trolley conveyors movably mounted thereon.

The primary object of the present invention is to provide in conjunction with said trolley conveyor system, a dumping system by which hangers removably mounted upon a pendant portion of the individual trolley conveyors may be automatically disengaged from the said pendant as the corresponding trolley conveyor moves through the dumping station to effect an automatic unload.

It is another object of the present invention to provide in such a trolley conveyor system an unloading station or dumping station which incorporates the framework including a trackway interposed within the trackway of the trolley conveyor system and which movably receives the respective trolley conveyors carrying the load mounting pendants which move through the said framework and incorporating tripping means associated with the pendant with pre-selected and pre-located stop pin and stop between the said tripper arm and a portion of the frame to effect a tilting movement of the tripper arm for disengaging the load or hanger means from the hook portion at the lower end of the said pendant.

These and other objects will be seen from the following specification and claims in conjunction with the appended drawing, in which:

Figure 1:
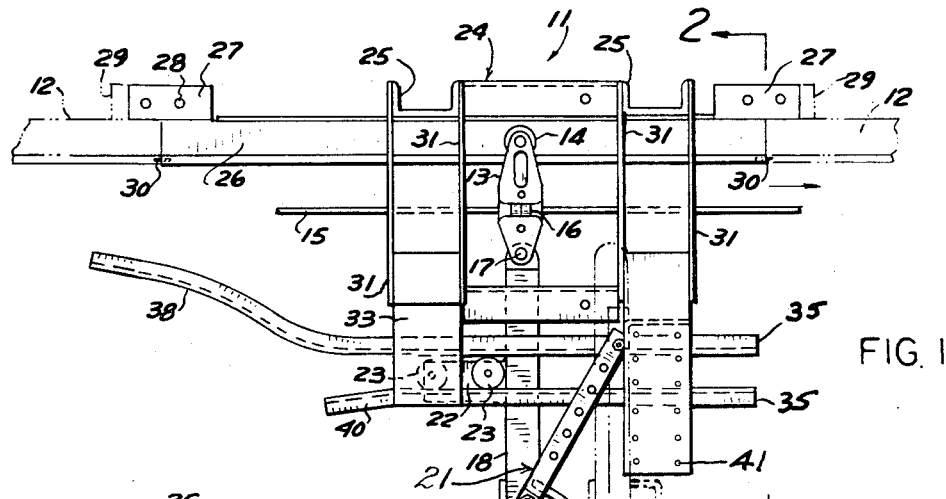
FIG. 1 is a fragmentary, side elevational view of a trolley conveyor system incorporating the present dumping station.

It will be understood that the above drawing illustrates merely a preferred embodiment of the invention, and that other embodiments are contemplated within the scope of the claims hereafter set forth.

Referring to the drawing, the present dumping station generally indicated at 11 is incorporated into a trolley conveyor system fragmentarily shown at 12 with suitable trackways upon which are mounted, movably, a series of longitudinally spaced trolley conveyors 13. Each conveyor includes spaced supporting rollers 14 mounted on the said trackway, FIG. 1. Each trolley conveyor also includes, intermediate its upper and lower ends, apertured means to provide an interlock as at 16 between a power-driven cable 15 or series of cable sections. These cable sections normally have upset or enlarged end portions which are brought into registry within an individual trolley conveyor and in the assembly of a conveyor elements are interconnected therewith whereby when driving power is transmitted to the cable elements 15 the trolley conveyors 13 are caused to move over the trackway of the trolley conveyor system as at 12 and onto the corresponding I-beam or track 26, which forms a part of the present dumping station 11.

A pendant 18 at its upper end is pivotally mounted as at 17 to lower portions of each trolley conveyor, FIG. 1, and at its lower end mounts or has secured thereto a forwardly extending carrying hook or holder 19 adapted to support a hanger or a tray mounting goods transported through the conveyor system said hanger being fragmentarily indicated at H in FIG. 1.

Each pendant pivotally mounts at its lower end at 20 the tripper arm generally indicated at 21, which normally is positioned to incline forwardly as shown in FIG. 1 for movement through the unloading station 11, but is adapted for pivotal movement in a counter-clockwise direction about its pivotal support 20, so that its lower end portion 47 disposed adjacent the carrying hook 19 upon its opposite sides is adapted for operative registry with the said hanger H and for ejecting or disengaging the same from the said hook as the tripper arm 21 is mechanically tilted by a pin and stop arrangement in a counter-clockwise direction from the position shown in FIG. 1.

The pendant intermediate its ends has a rearwardly extending arm 22 upon which are journalled opposed pairs of guide rollers 23.

The dumping station 11 includes an open framework 24 which has a pair of longitudinally spaced, horizontally disposed transverse channels 25 which span the I-beam form of track 26, which is suitably connected in longitudinal registry with the trolley conveyor system 12 so that the trolley conveyors 13-14 smoothly move through the dumping station over the track 26.

Figure 2:
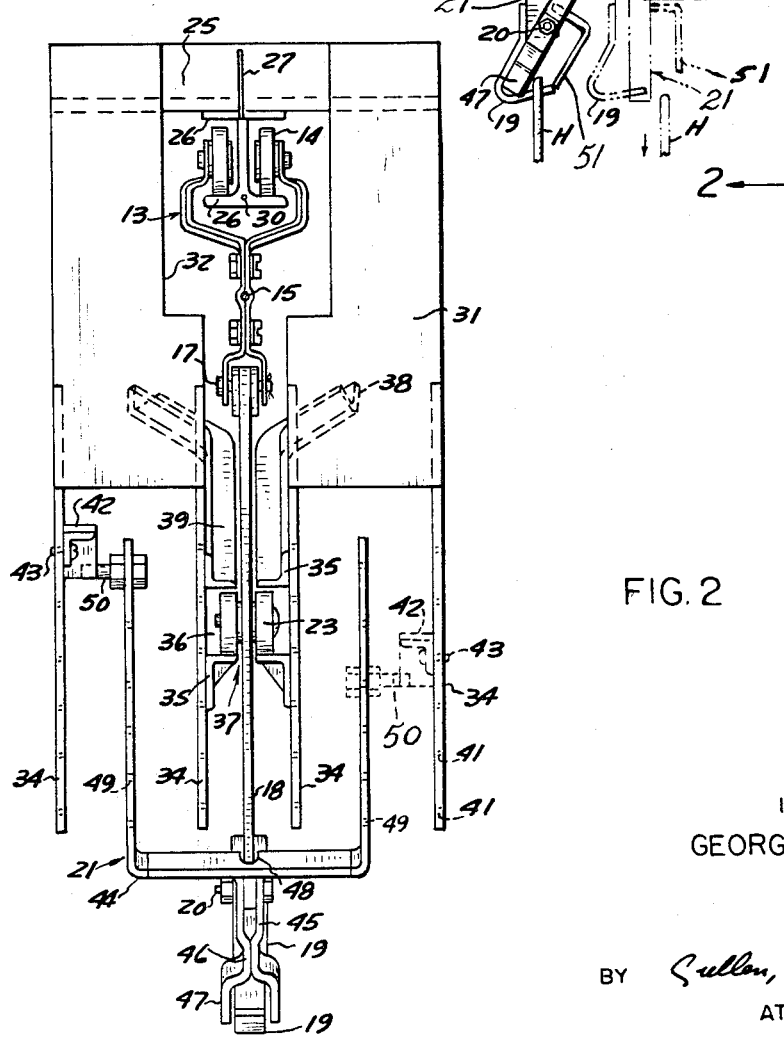
FIG. 2 is an end view taken in the direction of arrows 2—2 of FIG. 1, and on an increased scale.

Upright securing plates 27 at opposite ends of the I-beam track 26 project thereabove and are adapted for securing as at 28 to corresponding upstanding flanges 29 upon the trackway 12 of the trolley conveyor system, there being a suitable interlock as at 30, FIG. 2, for further interconnecting track 26 with corresponding end portions of the trackway 12, completing the assembly to provide a smooth passageway for the trolley conveyors through the unloading or dumping station.

The frame 24 also includes a series of upright parallel spaced plates 31, FIGS. 1 and 2, which have cut out apertures 32 therein respectively to provide suitable clearance for movement of the trolley conveyors 13–14 and the pendant 18 and including the tripper arm 21 therethrough. Each of the said plates 31 is secured to and depends from the respective channels 25 in a rigid framework.

A pair of upright spaced track mounting plates 33, FIG. 1, depend from one end portion of the unloading station 11 lying in planes parallel to the path of movement of the pendant therethrough, and an additional four upright parallel spaced stop plates 34 are fixedly secured to and depend from the opposite end portion of the frame 24 as best shown in FIG. 2.

The innermost opposed pair of stop plates 34, FIG. 2, in cooperation with the corresponding respectively aligned mounting plates 33 support the opposed pairs of spaced channels 35 which provide guide tracks or a guideway as at 36, FIG. 2, adapted to cooperatively and guidably receive the guide rollers 23 journalled upon pendant 18.

The respective angle plates 35 are spaced apart as at 37, FIG. 2, are adapted to guidably receive the pendant 18 as the corresponding trolley conveyor 13 moves through the unloading station.

In order to guide the pendant 18 so as to move smoothly through the unloading station, the uppermost pair of angle members forming a part of the guide tracks or guideway 36 are inclined upwardly and diverge as at 38, intermediate portions merging as at 39, FIG. 2, for registry with the upper of the pair of opposed angle members 35. Additionally, the forward end portions or left end portions of the lowermost opposed pair of spaced channels 35 are inclined partly downwardly and outwardly to provide with the guide members 38 an entrant opening for smoothly guiding pendant 18 and the corresponding guide rollers 23 for movement into registry within the trackway 36 and between the respective channel members 35 as best shown in FIG. 2.

Within each of the stop plates 34 there are provided a series of vertically spaced transverse stop mounting apertures 41 adapted to selectively receive the fastener 43 for the corresponding stop 42 selectively mounted upon any one of the four stop plates, any one, for example, of six vertically disposed positions for corresponding registry with a pre-set stop pin 50 mounted upon the tripper arm as hereafter set forth.

The tripper arm generally indicated at 21 is of general U-shape as indicated at 44 and includes a pair of spaced depending plates 45 which are pivotally mounted as at 20, FIGS. 1 and 2, to the lower portion of the pendant 18 directly above the carrying hook 19. Plates 45 converge as at 46 to provide a stop means adapted for registry with the hook 19, FIG. 1, for limiting pivotal movement of the tripper arm 21 in one direction to the position shown in FIG. 1. The portions 46 of the plates 45 are then curved outwardly and terminate in the downwardly opening spaced end portions 47 which are disposed adjacent opposite sides of and extend around carrying hook 19 and are adapted for operative registry with hanger H.

The bight portion of the tripper arm 44 is partly slotted as at 48 with said slotted portion adapted for registry with pendant 18 in order to limit tilting movement of tripper arm 21 to a substantially vertical position as shown in dotted lines in FIG. 1. And thus, the portions 46 and 48 provide stop means for limiting the arcuate pivotal movements of the tripper arm 21.

In each of the free end portions of the tripper arm 44 there are provided a series of longitudinally spaced pin mounting apertures 49, of which there are six in the illustrative embodiment adapted to selectively receive pin 50, which is adapted to selectively extend in one of a pair of directions depending upon which of a pair of adjacent stop plates 34 the respective stop 42 has been selectively mounted.

Thus, in the normal position of the tripper arm, FIG. 1, the tripper arm itself is so constructed as to movably pass through corresponding apertures in the frame 24 of the unloading station. The corresponding pre-located pin 50 is arranged so as to engage the corresponding stop 42, which upon continued movement of the trolley conveyor 13 cams the tripper arm from the inclined position shown in FIG. 1 to the dotted line upright position shown. This elevates the pin 50 so that it moves over the stop 42 and it can move through the frame and at the same time causes the lower end portions of the tripper arm to operatively engage the hanger H for disengaging the same from hook 19 as shown in dotted lines, FIG. 1.

Thus the hanger fragmentarily shown which may be loaded with an object such as clothes in a dry cleaning plant, or with a tray, or as employed in any factory for the transfer and transporting of goods, can drop into a hamper or some other type of guiding rail for movement off of and from the conveyor system for further processing.

By providing as in the illustrative embodiment a plurality of pin mounting apertures 49 in the respective free end portions of the tripper arm 44 it is seen that the tripper pin 50 may have any one of twenty-four positions, for illustration, since the pin could extend in a direction opposite from the position shown in FIG. 2, in which case it would be adapted for engagement with a corresponding stop 42, which would be mounted on the inner stop plate 34 adjacent thereto.

The pin 50 can also be selectively mounted so as to project selectively from opposite sides of the other arm and other free end portion of the tripper arm for operative engagement with a stop 42 which has been pre-selected and selectively mounted upon one of the pair of opposed stop plates 34 between which the respective free end portion of the tripper arm is adapted to move.

Thus, there has been disclosed in the present trolley conveyor system a means by which as the trolley conveyor moves through the unloading station there is a cam action between the tripper arm and some portion of the station for tilting the tripper arm for mechanically and automatically ejecting the hanger H from the hook on the pendant 18 as the conveyor assembly continues to move through the unloading or dumping station.

Thus, the garments or trays which are carried on the pendants 18 respond to a novel form of tripper arm 21. These arms are activated by the respective pin 50, which in the illustrative embodiment can be bolted in any one of twenty-four locations and comes in contact with the station and with the corresponding pre-located stop 42 bolted at any of the inner or outer stop plates 34. The pin as it makes contact together with the tripper arm is forced rearwardly at its upper end portion and this causes the lower arms 47 of the tripper arm to move forwardly across the carrying hook 19 wiping off the hangers H or carriers onto slick rails or dumping them into hampers.

It is seen that the respective pendants 18 for each trolley conveyor by virtue of the double pair of rollers 23 are guided through the entire length of the dump station and, thus, keep the tripper guided within close tolerance for accurate and positive action.

Employing a series of unloading or dumping stations 11 within the trolley conveyor system, the respective pins 50 corresponding to each conveyor can be pre-set as can be the stops 42 for a particular station so that garments or other objects carried by the system can be unloaded automatically in pre-determined areas.

While the trackway 26 has been shown horizontal, it is contemplated that the same could be at any desired inclination consistent with the present disclosure.

While the tripper and pendant have been described for use in a plant for transmitting articles employing a conveyor system, it is contemplated that the pendants and associated tripper could carry papers to any place for tripping into a chute or hopper, such as in a warehouse or in department stores.

Keeper 51 on tripper arm 21 prevents items H carried on hook 19 from falling off. Said keeper moves forwardly with the tripper arm, as shown in dotted lines, to permit the load to drop off at the discharge stations.

Having described my invention, reference should now be had to the following claims. I claim:

1. In a trolley conveyor system including an elongated trackway and a plurality of longitudinally spaced trolley conveyors movably mounted thereon;
    a dumping station in said system comprising a frame;
    a track on said frame connected in registry with said trackway;
    a pair of opposed spaced guide tracks extending longitudinally through said frame spaced below said tracks;
    a pendant pivotally suspended from each trolley conveyor guidably extending loosely between said guide tracks and at its lower end mounting a forwardly open carrying hook adapted to support a hanger;
    rollers journalled on said pendant and movably and guidably mounted upon said guide tracks;
    a forwardly inclined tripper arm movable through said frame pivotally mounted intermediate its ends upon said pendant, with its lower ends disposed adjacent said carrying hook adapted for operative registry with said hanger;

a pin upon an upper portion of said tripper arm and extending laterally thereof;

and a stop mounted on said frame normally in the path of movement of said pin;

said tripper arm functioning as a hanger retaining member and adapted to engage and shift the hanger laterally along the hook to discharge the hanger when the tripper arm pin engages said stop.

2. In the trolley conveyor system of claim 1, an upright stop plate on said frame having a series of vertically spaced stop mounting apertures therethrough;

said stop being selectively mounted on said stop plates;

there being a series of longitudinally spaced pin mounting apertures on said tripper arm;

said pin being selectively mounted on said tripper arm.

3. In the trolley conveyor system of claim 1, a pair of spaced upright stop plates on said frame between which said tripper arm is movable;

there being a series of vertically spaced stop mounting apertures on each stop plate;

said stop being selectively mounted on one of said stop plates;

there being a series of longitudinally spaced pin mounting apertures in said tripper arm;

said pin being selectively mounted on said tripper arm to extend selectively in one of two lateral directions for registry with said pre-located stop.

4. In the dumping station for a trolley conveyor system defined in claim 1, a means on said tripper arm limiting its pivotal movements.

5. In the dumping station for a trolley conveyor system of claim 1, said tripper arm being U-shaped with its upper free end portions each having therein a series of longitudinally spaced pin mounting apertures therethrough;

said pin being selectively mounted upon one of said free ends and selectively extending in one of two directions;

pairs of spaced upright stop plates on said frame between which the end portions of said tripper arm movably extend;

there being a series of vertically spaced stop mounting apertures in each stop plate;

said stop being selectively mounted on one of said stop plates corresponding to a pre-selected pin mounting.

6. In the dumping station of trolley conveyor system of claim 1, said guide tracks diverging laterally and vertically to guide said pendant and rollers into the said guide tracks.

7. In a trolley conveyor system including an elongated trackway and a plurality of longitudinally spaced trolley conveyors movably mounted thereon;

a pendant pivotally suspended from each trolley conveyor and at its lower end mounting a forwardly opening carrying hook adapted to support a hanger, and a forwardly inclined tripper arm pivotally mounted intermediate its ends upon said pendant with its lower end disposed adjacent said carrying hook adapted for operative registry with said hanger, there being a series of longitudinally spaced pin mounting apertures upon the upper portion of said tripper arm, and a pin selectively mounted upon said tripper arm and projecting laterally thereof;

and a selectively mounted stop mounted in said conveyor system and normally in the path of movement of said pin and engageable therewith on movement of said pendant for tilting said tripper arm, said latter functioning as a hanger retaining member engaging the hanger and shifting it laterally along the hook disengaging said hanger from said hook.

8. In a trolley conveyor system including an elongated trackway and a plurality of longitudinally spaced trolley conveyors movably mounted thereon;

a dumping station in said system comprising a frame;

a track on said frame connected in registry with said trackway;

a pair of opposed spaced guide tracks extending longitudinally through said frame spaced below said tracks;

a pendant pivotally suspended from each trolley conveyor guidably extending loosely between said guide tracks and at its lower end mounting a carrying holder adapted to support a hanger;

rollers journalled on said pendant and movably and guidably mounted upon said guide tracks;

a forwardly inclined tripper arm movable through said frame pivotally mounted intermediate its ends upon said pendant, with its lower ends disposed adjacent said carrying holder adapted for operative registry therewith;

a pin upon an upper portion of said tripper arm and extending laterally thereof;

and a stop mounted on said frame normally in the path of movement of said pin;

said tripper arm functioning as a hanger retaining member and adapted on pivotal movement to disengage the hanger from the carrying holder to discharge the hanger when the tripper arm pin engages said stop.

References Cited

UNITED STATES PATENTS 1,510,580   10/1924   Bryen _____ 214—59

FOREIGN PATENTS 105,410   1/1927   Germany.

ARTHUR L. LA POINT, *Primary Examiner.*

H. BELTRAN, *Assistant Examiner.*